(12) United States Patent
Lollio et al.

(10) Patent No.: US 12,038,365 B2
(45) Date of Patent: Jul. 16, 2024

(54) OPTICAL PARTICLE SENSOR

(71) Applicant: ams Sensors Germany GmbH, Jena (DE)

(72) Inventors: Alex Lollio, Premstaetten (AT); Boon Chong Cheah, Premstaetten (AT); Filip Frederix, Premstaetten (AT); Remco Verdoold, Premstaetten (AT); Markus Dantler, Premstaetten (AT); Erik Jan Lous, Premstaetten (AT)

(73) Assignee: AMS SENSORS GERMANY GMBH, Jena (DE)

( * ) Notice: Subject to any disclaimer, the term of this patent is extended or adjusted under 35 U.S.C. 154(b) by 288 days.

(21) Appl. No.: 17/617,650

(22) PCT Filed: Jun. 5, 2020

(86) PCT No.: PCT/EP2020/065673
§ 371 (c)(1),
(2) Date: Dec. 9, 2021

(87) PCT Pub. No.: WO2020/249485
PCT Pub. Date: Dec. 17, 2020

(65) Prior Publication Data
US 2022/0244160 A1 Aug. 4, 2022

Related U.S. Application Data

(60) Provisional application No. 62/859,868, filed on Jun. 11, 2019, provisional application No. 62/861,416, (Continued)

(51) Int. Cl.
*G01N 15/0205* (2024.01)
*G01N 15/00* (2024.01)
(Continued)

(52) U.S. Cl.
CPC ..... *G01N 15/0211* (2013.01); *G01N 15/0205* (2013.01); *G01N 15/06* (2013.01);
(Continued)

(58) Field of Classification Search
CPC ........... G01N 15/0211; G01N 15/0205; G01N 15/06; G01N 21/359; G01N 2015/0046; G01N 2015/0693; G08B 17/107
See application file for complete search history.

(56) References Cited

U.S. PATENT DOCUMENTS

7,129,847 B2 * 10/2006 Right ..................... G08B 17/10
340/606
7,746,239 B2 * 6/2010 Nagashima .......... G08B 25/002
340/630
(Continued)

FOREIGN PATENT DOCUMENTS

CN 102232183 A 11/2011
EP 2093731 A1 8/2009
(Continued)

OTHER PUBLICATIONS

International Search Report and Written Opinion for corresponding PCT Patent Application No. PCT/EP2020/065673 dated Sep. 15, 2020.
(Continued)

*Primary Examiner* — Edmond C Lau
*Assistant Examiner* — Joshua M Carlson
(74) *Attorney, Agent, or Firm* — Tarolli, Sundheim, Covell & Tummino, LLP (57) ABSTRACT

A particle detector. The particle detector comprises one or more light sources, an optical sensor, and a controller. The one or more light sources are collectively operable to simultaneously produce at least two wavelength ranges of emitted light. The optical sensor is configured to sense light
(Continued)

of the at least two wavelength ranges emitted by the one or more light sources and to distinguish each range. The controller is configured to detect particles based on the light sensed by the optical sensor.

19 Claims, 6 Drawing Sheets

Related U.S. Application Data filed on Jun. 14, 2019, provisional application No. 62/991,865, filed on Mar. 19, 2020.

(51) Int. Cl.
  *G01N 15/06* (2024.01)
  *G01N 15/075* (2024.01)
  *G01N 21/359* (2014.01)
  *G08B 17/107* (2006.01)

(52) U.S. Cl.
  CPC ... *G08B 17/107* (2013.01); *G01N 2015/0046* (2013.01); *G01N 15/075* (2024.01); *G01N 21/359* (2013.01)

(56) References Cited

U.S. PATENT DOCUMENTS

| | | | |
|---|---|---|---|
| 9,098,989 B2 * | 8/2015 | Fischer | G08B 17/107 |
| 9,482,607 B2 * | 11/2016 | Erdtmann | G08B 17/107 |
| 2006/0114112 A1 | 6/2006 | Cole | |
| 2006/0188113 A1 * | 8/2006 | Tice | G08B 17/125 340/630 |
| 2008/0246623 A1 | 10/2008 | Nagashima | |
| 2010/0194574 A1 | 8/2010 | Monk et al. | |
| 2011/0181870 A1 | 7/2011 | Penney et al. | |
| 2015/0346086 A1 | 12/2015 | Erdtmann | |
| 2016/0033400 A1 | 2/2016 | Alexander | |
| 2016/0328936 A1 * | 11/2016 | Fischer | G01N 21/53 |
| 2018/0220500 A1 * | 8/2018 | Staton | A47J 37/0623 |

FOREIGN PATENT DOCUMENTS

| | | | |
|---|---|---|---|
| EP | 3 029 648 A1 | | 6/2016 |
| JP | 2013195328 A | | 9/2013 |
| JP | 2019054345 A | * | 4/2019 |

OTHER PUBLICATIONS

CN Office Action for corresponding CN application No. 202080042787.1, issued Mar. 4, 2024, 22 pgs.

* cited by examiner

OPTICAL PARTICLE SENSOR

RELATED APPLICATIONS

The present invention is a U.S. National Stage under 35 USC 371 patent application, claiming priority to Serial No. PCT/EP2020/065673, filed on Jun. 5, 2020; which claims priority from U.S. Provisional Patent Application No. 62/859,868 filed Jun. 11, 2019; U.S. Provisional Patent Application No. 62/861,416 filed Jun. 14, 2019; and U.S. Provisional Patent Application No. 62/991,865 filed Mar. 19, 2020, the entirety of each are incorporated herein by reference.

FIELD OF THE INVENTION

The present invention relates to the measurement and analysis of particles within medium fluid (i.e. within a liquid or gas). In particular, it relates to improvements to methods and devices for such detection. Some embodiments specifically relate to the detection of smoke, e.g. for detecting fires, but the invention as a whole is not limited to this.

BACKGROUND

The detection, measurement and analysis of impurities and/or particles in fluid is important for many different applications (both industrially, and for consumers). Industrial applications include measuring the particulate content of gases when filling cylinders or during transport, analysis of water supplies, or quality control for clean rooms. Consumer applications include home ventilation systems (e.g. activating ventilation when particulates in a room reach a threshold level), and smoke detection.

When detecting fires, it is important to detect both open flames and smouldering fires. Smouldering fires can start and spread with very little air supply, and may be ignited wherever there is high heat and a fuel source—e.g. in malfunctioning electronic devices (where the heat is caused by the malfunction, and the fuel source is the device itself), or tumble driers (where the heat is present during normal operation, but a fault may cause fuel to be present at the heat source). While smouldering fires cause relatively little direct damage, they may spread into larger fires, and it is often possible to use relatively simple countermeasures to prevent a smouldering fire (e.g. turning off a malfunctioning piece of electrical equipment) when compared to an open fire (e.g. using a fire extinguisher).

Figure 1:
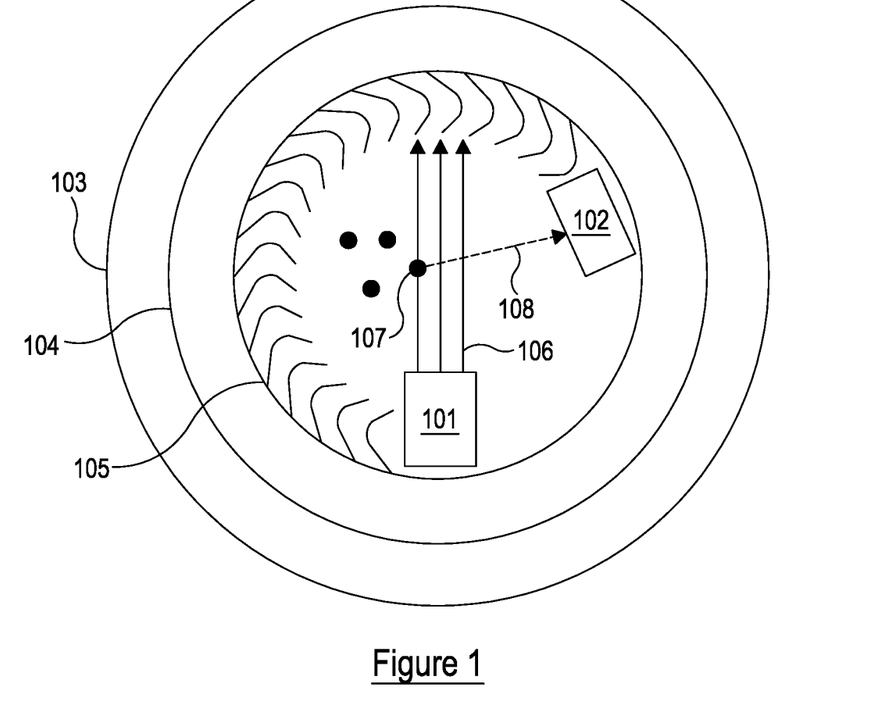
FIG. 1 shows a conventional smoke detector.

Modern smoke detectors, as shown in FIG. 1, use a light source 101 (usually an infra-red LED) and an optical sensor 102 (usually a photodiode) located within a chamber. The chamber is shaped to allow air to flow through, while preventing unwanted light from reaching the sensor. The chamber may be formed from an outer housing 103, a "dark housing" 104 which blocks external light, and a scattering chamber 105 which contains the LED and photodiode. The light 106 from the LED is not normally directed to the sensor, but when smoke 107 enters the chamber, the light from the LED is scattered 108, producing a signal at the sensor, which then triggers the alarm.

Figure 2:
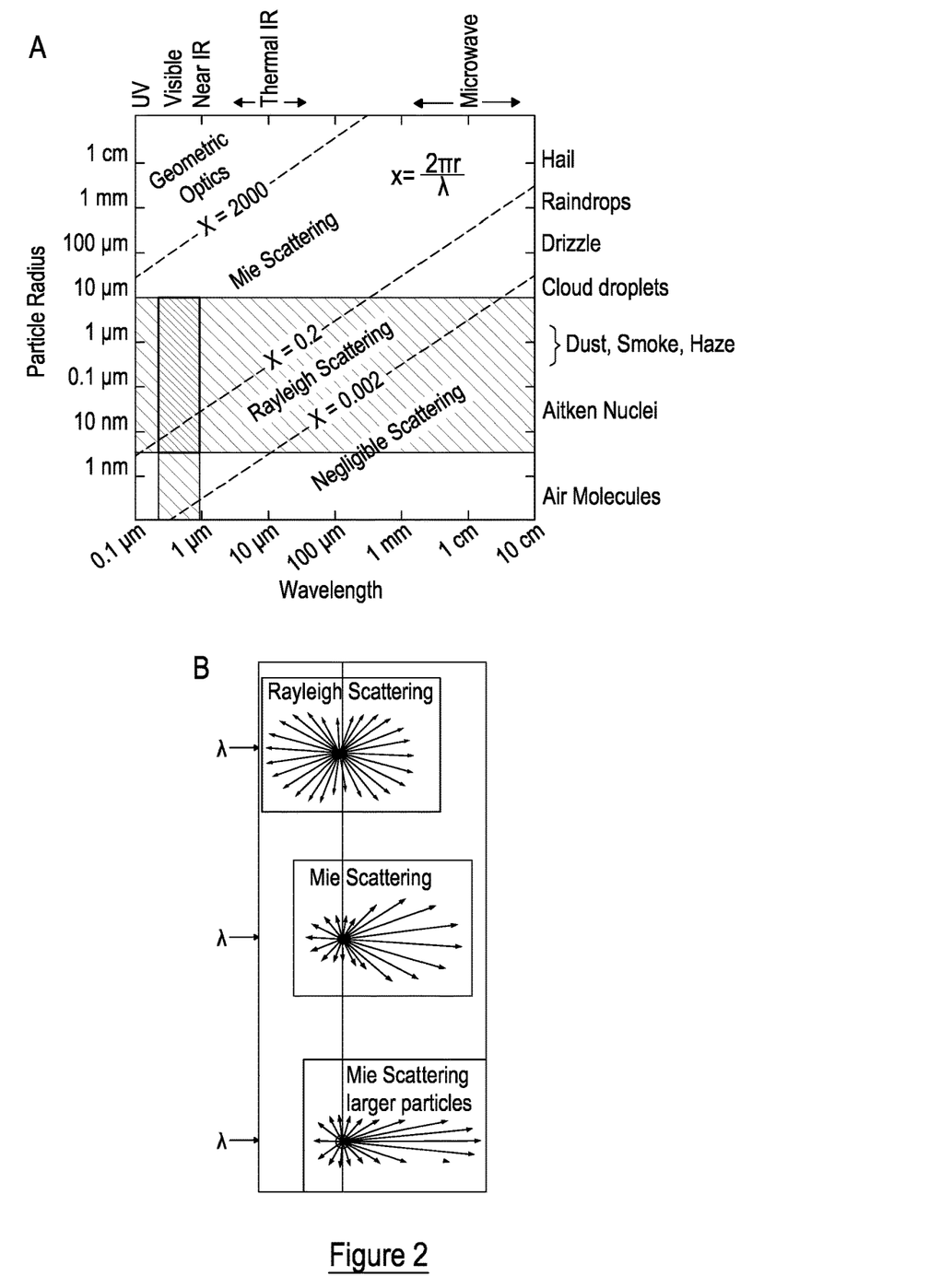
FIG. 2 illustrates various types of scattering, and how they depend on particle size and the wavelength of scattered light.

The scattering of particles is highly dependent on the particle size. The size determines at which wavelength the particle will either scatter according to Mie or according Rayleigh scattering. Both scattering principles have distinct scattering shape cross-sections, illustrated in FIG. 2. The scattering efficiency of various particles depends on the wavelength used to scatter the particle (or on the wavelength used to detect them). Some optical smoke (or particle detectors) work in the near infrared wavelength regime, where most particles show Mie type scattering with a large forward efficiency. Placing a detector at ~135° will still obtain a large part of the scattered light, not being influenced by the incident light source. Smaller particles will dominantly show Rayleigh scattering where both backward and forward scattering efficiencies are equally strong. For small particles, observing scattering at 135° will result in a signal such that an additional sensor at a much narrower angle of 45° should result in an equal amount of signal (e.g., for spherical particles). For larger particles, the signal at 45° will be smaller than the signal at 135°. This allows discrimination of particle sizes, which is used to prevent dust from resulting in a false alarm (since dust is generally greater than 1 micron in diameter, and smoke particles are generally less than 1 micron—though these thresholds may be adjusted depending on the expected types of fire, the expected environment (e.g. how dusty it is), and the tolerances for false alarms vs reduced sensitivity). However, such a device is still unable to discriminate between smoke and water vapour, and the additional detector makes it more bulky, and less able to fit within standard housings.

Such existing smoke detectors have several common disadvantages:

- They generate many false alarms, including from water vapour or droplets.
- Dust entering into the measurement chamber or smoke settling in the chamber can cause contamination, which can lead to false alarms, reduced sensitivity, or even complete loss of function (e.g. if dust blocks the light source).
- Aging of the components (as well as dust contamination) will cause a change in the sensitivity of the detector. This is generally compensated for either by regular servicing or replacement, or by a time dependent adjustment of the detection thresholds.
- The design requires air to enter the measurement chamber, but external light to be excluded—this requires a complicated "labyrinth" structure, which reduces the air flow to the detector. This also causes the detector to be bulky, making them generally ugly—which causes users to put them out of the way, further reducing airflow.
- Increased detection times (e.g. due to poor air flow to the sensor, or reduced sensitivity or longer measurement cycles to reduce false alarms) cause the alarm to be set-off far too late which may result in smoke poisoning.
- Additionally, current detectors are unable to analyse and indicate the stage and progression of fire from smouldering to open fire.
- There are only a limited number of alarm warning thresholds—e.g. an alert that smoke is building up, and an alert that fire is likely. The detector can determine that there is a fire, but not the stage of the fire or a possible cause. This makes it difficult for users to determine the correct countermeasure to the fire.

There is therefore a need for a detector which avoids at least some of the above mentioned disadvantages.

SUMMARY

According to a first aspect of the present invention, there is provided a particle detector. The particle detector comprises one or more light sources, an optical sensor, and a controller. The one or more light sources are collectively operable to simultaneously produce at least two wavelength ranges of emitted light. The optical sensor is configured to sense light of the at least two wavelength ranges emitted by the one or more light sources and to distinguish each range. The controller is configured to detect particles based on the light sensed by the optical sensor.

The controller may be further configured to obtain a background measurement, the background measurement being a measurement of light sensed by the optical sensor during a period when the one or more light sources are not producing light, and adjust future measurements received from the optical sensor on the basis of the background measurement.

Alternatively, the controller may be further configured to obtain a background measurement, the background measurement being a measurement of light sensed by the optical sensor during a period when the one or more light sources are not producing light, and determine one or more wavelength ranges of the at least two wavelength ranges of emitted light for which the background measurement is acceptable, and to detect particles based on light sensed by the optical sensor in only those one or more wavelength ranges.

The one or more light sources may be pulsed, and the controller may be configured to obtain the background measurement during the off-cycle of each pulse.

The one or more light sources may emit frequency modulated light, and the controller is configured to apply corresponding demodulation to the measurements of the sensor.

The one or more light sources and the optical sensor may not be within a housing.

The light source may emit light in pulses, and the controller may be configured to determine a distance of detected particles based on a time difference between a start of a pulse of the light source and a start of a pulse in the light sensed by the optical sensor.

The controller may be configured to discriminate between particle sizes based on differences between the light sensed at each of the wavelength ranges.

The particle detector may be a smoke detector.

The controller may be configured to discriminate between smoke and water based on comparing light sensed in first and second wavelength ranges of the two or more wavelength ranges.

The controller may be configured to determine a ratio of light sensed in a first wavelength range and light sensed in a second wavelength range, and discriminate between smoke and water based on said ratio.

A first wavelength range may be within the visible light spectrum, and a second wavelength range may be within the near infra-red spectrum.

The controller may be configured to compare light sensed by the optical sensor to one or more previously determined profiles, each profile comprising information about the expected evolution over time of light sensed by the sensor during a fire, and to signal the detection of a fire if the time evolution of the light sensed by the optical sensor corresponds to one of the profiles.

According to a second aspect of the present invention, there is provided an electronic device having integrated within it a smoke detector, wherein the smoke detector is configured to cut power to other components of the electronic device on detection of smoke.

The smoke detector may be a particle detector according to the first aspect.

The electronic device may be one of:
an electric vehicle;
a dryer;
an oven;
an electronic cigarette.
A coffee machine According to a third aspect, there is provided a ventilation system having integrated within it a particle detector according the first aspect, wherein the particle detector is configured to detect smoke in an air flow through the ventilation system.

According to a fourth aspect, there is provided a method of detecting fires. A particle detector is provided, the particle detector being capable of detecting smoke particles and determining sizes of detected particles. Measurements from the particle detector are compared to one or more previously determined profiles, each profile comprising information about the expected evolution over time of particle size and density for a fire. The detection of a fire is signalled if the time evolution of the measurements of the detector corresponds to one of the profiles.

Each profile may correspond to a particular fire stage and to the combustion of one or more materials.

Signalling the detection of a fire may comprise indicating a fire stage corresponding to the identified profile.

The profiles may comprise one or more of:
a profile indicating smouldering electronics, wherein the expected evolution over time of particle size and density is a rising density of particles in the 0.001 to 0.1 micron range;
a profile indicating open fire, wherein the expected evolution over time of particle size and density is a rapidly rising density of particles greater than 0.1 micron. Compared to the known systems described in the background, the present particle detector disclosed here has the following advantages:
1. it is able to discriminate between particle sizes and/or between different types of particle (e.g. smoke vs water)
2. The detection time is reduced for a similar level of sensitivity
3. The detector can be made more compact, and may be used without a housing Finally, the present particle detector disclosed here utilises a novel approach at least in that it comprises an optical sensor configured to sense light of at least two wavelength ranges, and to distinguish each range.

BRIEF DESCRIPTION OF THE DRAWINGS

The disclosure will now be described by way of example only and with reference to the accompanying drawings, in which.

DETAILED DESCRIPTION

Several improvements to particle detectors will be described herein. It will be appreciated that while these are mainly described in terms of smoke detectors for ease of understanding the examples, the techniques are also relevant to detection of other particles in other fluids (i.e. liquids or gases other than air). It will also be appreciated that the listed improvements may be applied separately, and while there may be synergistic effects between them, the presence of one improvement does not require the presence of any of the others unless stated.

Multi-Wavelength Detection

The first improvement that can be made to particle detection is the use of multiple wavelengths of light (i.e. separate detection of scattered light in at least two wavelength channels). As will be described in more detail below, this allows improved size discrimination, and also allows discrimination between substances, e.g. between water, smoke and/or dust.

The multi-wavelength detection uses a light source which emits light at each of the target wavelengths (or a combination of light sources, which together emit light at all of the target wavelengths) and a spectral sensor or another optical sensor or sensor array which gives intensity readings for each of a plurality of different wavelengths or wavelength ranges.

Figure 3A:
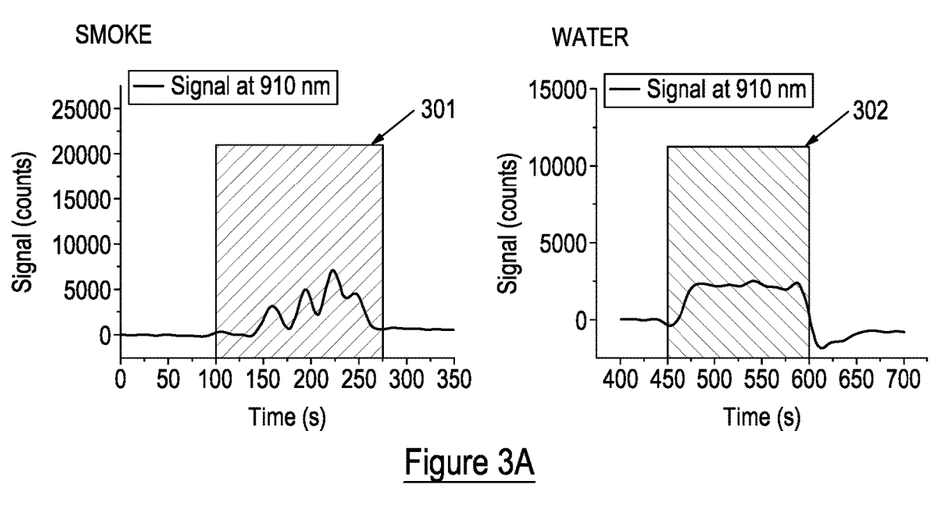
FIGS. 3A and 3B show results obtained from an exemplary detector during detection of smoke and water.
Figure 3B:
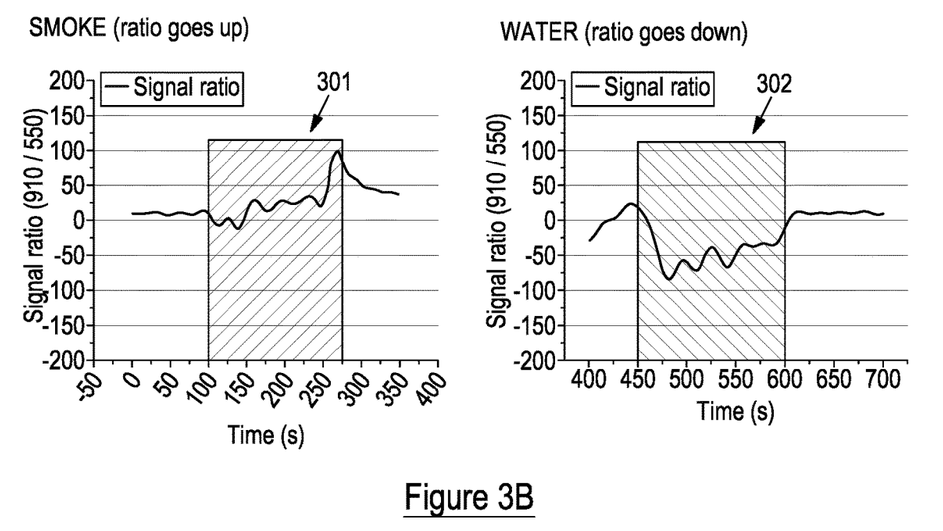

One particularly useful pairing is a wavelength in the visible spectrum (380-740 nm), e.g. 400-600 nm, in particular 470 nm or 550 nm, and a wavelength in the near-infrared (NIR) spectrum (780 nm to 2500 nm), e.g. a wavelength in the range 900-1500 nm, or 900-1150 nm, in particular 910 nm. Use of these wavelengths allows discrimination between smoke and water droplets. FIGS. 3A and 3B show the results obtained from a 910 nm/550 nm sensor. FIG. 3A shows the scattering signal at 910 nm (adjusted to a zero baseline), and FIG. 3B shows the ratio of the scattering signal at 910 nm to the scattering signal at 550 nm.

Figure 4:
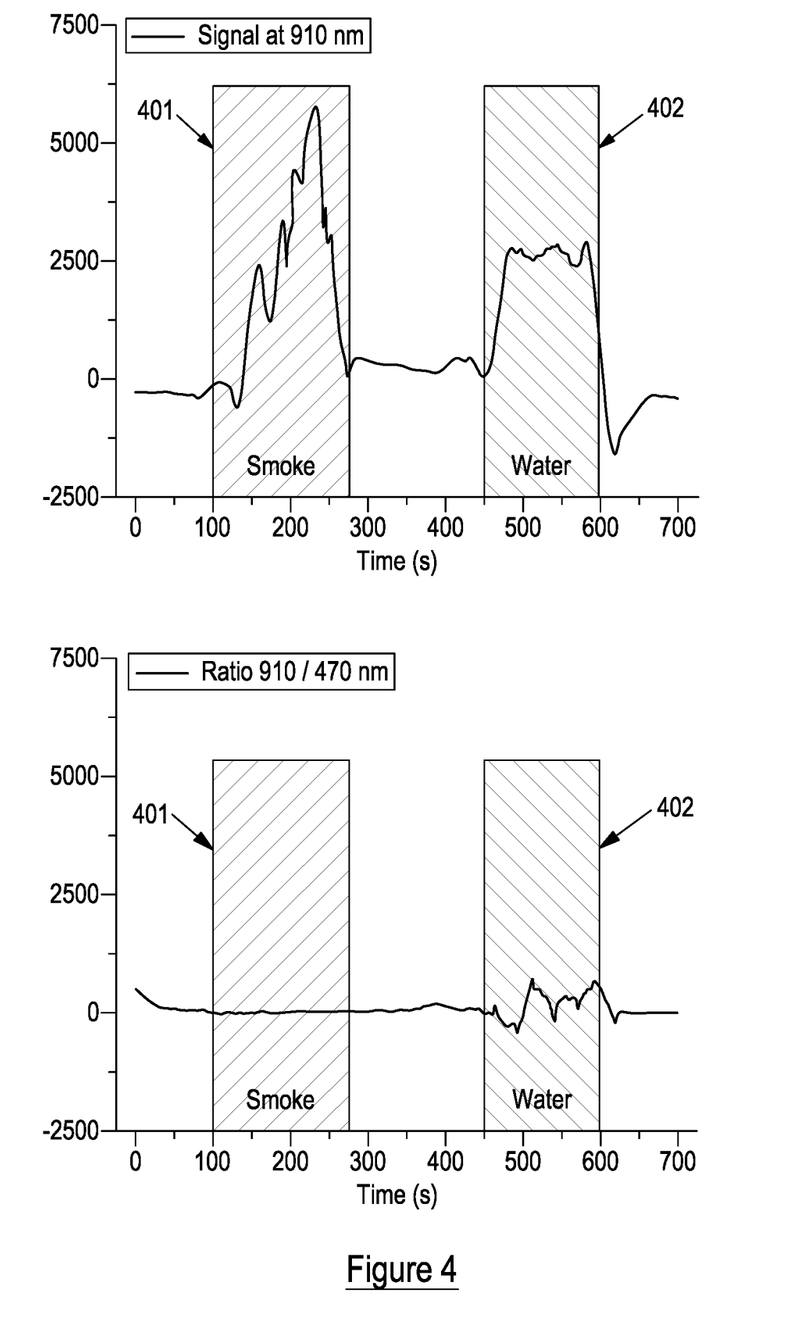
FIG. 4 shows results obtained from a further exemplary detector during detection of smoke and water.

When smoke 301 is introduced into the chamber, the 910 nm signal increases, as does the ratio between the 910 nm signal and the 550 nm signal. When water 302 is introduced into the chamber, the 910 nm signal also increases (which would cause a false alarm in a single-wavelength sensor), but the ratio between the 910 nm signal and the 550 nm signal decreases. This allows smoke and water to be distinguished, reducing the potential for false alarms. FIG. 4 shows similar measurements for a 910 nm/470 nm sensor—in this case, when smoke 401 is introduced, the 910 nm signal rises, but the 910 nm/470 nm ratio remains approximately constant. When water 402 is introduced, both the 910 nm signal and the 910 nm/740 nm ratio increase.

A similar technique can be used to discriminate based on particle size for particles of the same substance (e.g. the size of smoke particles). In general, for two wavelengths, the signal produced by the scattering of the higher wavelength will decrease faster than the signal produced by the scattering of the lower wavelength as the particle size increases. As such by monitoring the absolute signals (i.e. the signals produced by the sensor at each wavelength) and/or the relative signals (i.e. the differences and/or ratios between signals produced by the sensor at each wavelength), it is possible to discriminate based on particle size.

Previous work has shown some limited particle size discrimination in this way, to avoid dust, but this used pulsed light sources, with the chamber being illuminated separately by each source, and a broad-spectrum sensor being used to detect the scattering. The above-described measurement device has the significant advantage that it does not require pulsing between different light sources (as they are simultaneously active, or can be a single broad spectrum light source), which means that detection times can be significantly shorter.

Additionally, using multiple wavelengths allows for improved resistance to contamination of the housing, or "stray light" resulting from unwanted reflections between the light source and the sensor (i.e. reflections from the housing itself, rather than from the particles of interest). Contamination will tend to provide a constant reduction of the "stray" signals of particular wavelengths, and the detection of contamination may trigger a recalibration of the sensor, or an alert that the sensor requires servicing. With multiple wavelengths, it is likely that there is at least one wavelength which will allow for useful operation of the sensor even in the presence of contamination.

Additionally, as the light source(s) age, the relative intensities of the wavelengths may change, which may also be used to trigger calibration and/or servicing alerts.

The sensor may be calibrated for the power spectrum of the light source(s).

The detector may be configured to perform a self-calibration routine, when the detector senses clean air, e.g. when the detected light is steady around a low value for at least a predetermined time (e.g. at least 1 minute, or at least 1 hour).

While the above has provided examples using two wavelengths, greater numbers of wavelengths may be used. The use of a spectral sensor, or other optical sensor with a large number of independent ranges for wavelength detection, and a broad-spectrum light source allows the wavelengths of interest to be altered by software, rather than requiring physical changes to the unit—which is a significant improvement in allowing upgrades to the unit if better detection techniques are developed.

Open Form Factor Particle Measuring Device

A particle measuring device may be constructed which does not require a scattering chamber. This is particularly useful in that it increases airflow to the detection region, and allows for significantly smaller devices.

Figure 5:
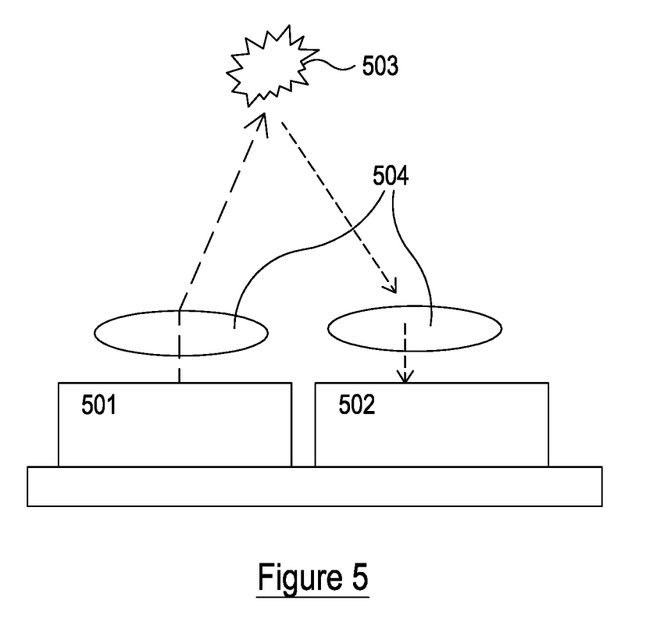
FIG. 5 shows an exemplary particle measuring device.

An example particle measuring device is shown in FIG. 5. The device comprises a light source 501, which illuminates at least a target region, and a detector 502 which detects light scattered by particles 503 within the target region. Either or both of the light source 501 and detector 502 may be equipped with optical devices 504 to optimise their performance (e.g. to focus the outgoing/incoming light).

Elimination of Background Light

Where background light is expected to be present, the detector may be configured to reduce the effect of this light on the resulting signal.

In a first example method, the light is switched off, and the signal from the detector monitored to obtain a "background signal". The background signal is then subtracted from future measurements made by the detector while the light source 501 is switched on.

In a second example method, which applies to a multi-wavelength detector as described earlier, a background signal is obtained as above. The background signal is analysed to determine which one or more of the wavelengths used by the multi-wavelength detector have significant background light (e.g. below a threshold, or as a proportion of the background light of other channels), and these wavelengths are used for detection. If multiple wavelengths in specific bands are desired (e.g. to avoid false alarms due to water vapour), then this process may be repeated for each band (e.g. for both visible light and for near infra-red light).

By pulsing the light source, either of the above two examples may be performed frequently with only a small impact on measurement time (which will be more than made up for by the increased sensitivity).

In a third example method, the light source may be frequency modulated by any suitable method as known in the art of signal processing, and the signal from the detector may be demodulated, e.g. using phase-sensitive lock-in.

Each of the above three examples may be combined—e.g. a background signal may be obtained, and both used to determine the most suitable wavelengths, and subtracted from the eventual measurements, or the most suitable wavelengths may be determined, and frequency modulation used on those wavelengths to further improve the signal to noise ratio.

Detection of Particle Location and Motion

In a particle detector with a pulsed light source, the "time of flight" (i.e. the difference in time between the start of a pulse of the light source, and the start of the corresponding pulse in the sensor signal) can be used to determine the distance of the particle. Comparing these measurements over multiple pulses can be used to estimate the speed of the particle. This information may be used in several ways.

Firstly, smoke tends to move, so any stationary detection is unlikely to be smoke—e.g. it may be a feature of the chamber (for closed detectors) or the environment (for open detectors), or it may be dust which has settled on the chamber wall. Additionally, smoke tends to rise, so falling objects are likewise unlikely to be smoke. Finally, smoke tends to move at a moderate speed, so rapidly moving objects are unlikely to be smoke (they may be, e.g. flying insects in view of an open detector).

Secondly, the distance measurement may be used as a proxy for measuring the density of the particles—with a higher number density of fluid-borne particles, the average distance of particle measurements would be expected to be lower.

Detection of Fire Stages

Figure 6:
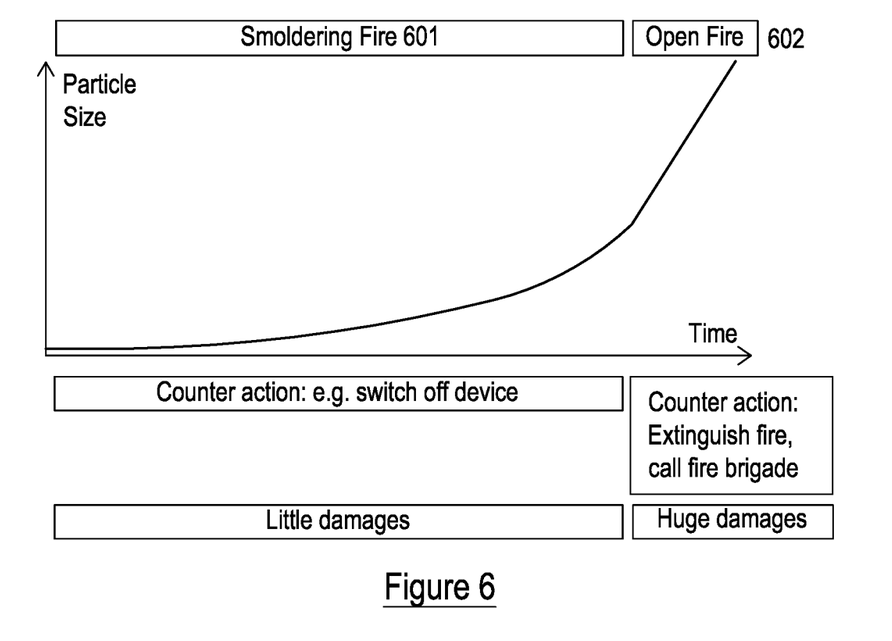
FIG. 6 illustrates the progression of particle sizes during a fire caused by electronics.

The discrimination of particle sizes by a smoke detector allows for more intelligent approaches to fire detection. For example, as shown in FIG. 6, it has been found that for most fires caused by electronics, there is an initial "smouldering" stage 601 which produces a low quantity of very small (0.001 to 0.1 micron) smoke particles. As the smouldering intensifies, the number and size of the particles increases gradually, and then increases rapidly as an open fire 602 breaks out.

As such, by detecting the number and size of particles, it is possible to detect and discriminate between the smouldering stage and the open fire stage, and to allow earlier detection of the smouldering stage. For example, a gradual increase in both size and number of particles may indicate a smouldering fire, even if the density of particles would not be high enough to trigger a smoke detector normally).

The discrimination of fire stages can be used to provide more useful notifications to occupants and/or emergency services, and/or to activate automatic countermeasures. For example, smouldering electronics can often be prevented from causing an open fire if they are switched off while still smouldering, and this could be done either automatically or by a building occupant who has been suitably notified. On the other hand, an open fire is a dangerous situation and the building occupant should be warned to seek an exit route which avoids the fire.

The "profile" of the fire, i.e. the change in number density and size of particles as the fire evolves, will depend on the materials which are undergoing combustion, and on the stage of combustion (pyrolysis, smouldering, flame with excess oxygen, or flame with insufficient oxygen). For example, unlike the electronics fires discussed above, n-heptane (commonly used as a fuel for fires when testing smoke detectors) will tend to produce a small number of large particles when smouldering, and a large number of small particles when in open fire.

Fire profiles can be determined experimentally for certain materials or situations (e.g. using samples of individual materials, or measurements from fires in simulated "real-world" rooms) by the use of a detector able to discriminate particle sizes during a test fire. A smoke detector for practical use may then use these fire profiles to detect fires.

In one example, the smoke detector may have a number of fire profiles stored thereon, and will sound an alert if the characteristics of the detected particles match any of the profiles, indicating the fire stage and/or the possible source (e.g. a smouldering electronics fire, or an open wood fire). The fire profiles may be selected based on the likely uses of the smoke detector—for example fires in a home will have a very different range of likely fuels to fires in industrial settings.

Integrated Smoke Detection

Several of the above improvements allow for smaller smoke detector units. Currently, smoke detection is primarily carried out by specialised devices, which are relatively bulky. Instead, a small smoke detection module making use of one or more of the above improvements may be integrated within other devices, for early detection of faults which cause smouldering or fires.

In one example, the smoke detection may be integrated within an electronic device, particularly an electronic device with a risk of causing fires (e.g. devices with large batteries or for charging large batteries such as electric vehicles, devices with heating elements such as dryers, electronic cigarettes and coffee machines, or devices with high power loads such as ovens, and fridges). The detector comprises a light source and a sensor, where the light source illuminates a detection region, and the sensor is positioned to detect scattered light from the detection region. The detector may also comprise a housing which contains the light source and sensor, and have channels to allow air flow through the detection region. Alternatively, the detector may be of the "open form factor" type discussed above, and may not have a specific housing (though may be integrated within the housing of the electronic device).

On detection of smoke, the electronic device may be configured to sound an alarm, and/or to take appropriate countermeasures such as shutting off the device.

The detector may make use of the "fire profiles" described above—e.g. having profiles stored thereon for known combustion risks for the device, such as smouldering electronics, or combustion of fabric (for dryers). The detected type of fire may be used to determine the appropriate countermeasure and/or alert level on detection of smoke. For example, in a device where smouldering electronics is detected, power may be cut off from the device and only a low-level alert sounded, whereas in a device where open flame is detected, power may be cut off and a louder alert sounded.

In another example the smoke detection may be integrate within devices with a high airflow, such as ventilation units, to detect fires on the input side of the unit. This is particularly useful in e.g. fume hoods above cooking places in kitchens. In this case, detection of smoke is used to sound an alert—though countermeasures may also be activated if the smoke detection unit has the ability to do so (e.g. connection to a "smart oven" which can be shut off, or access to cut power to appliances within the kitchen).

In yet another example the detector may be provided within a portable device, either as a specific smoke detection unit or as part of an existing portable device such as a mobile phone. This allows the user to have a smoke detector present for safety, even in environments outside of their control, e.g. when visiting other people's houses.

Exemplary Figures

Figure 7:
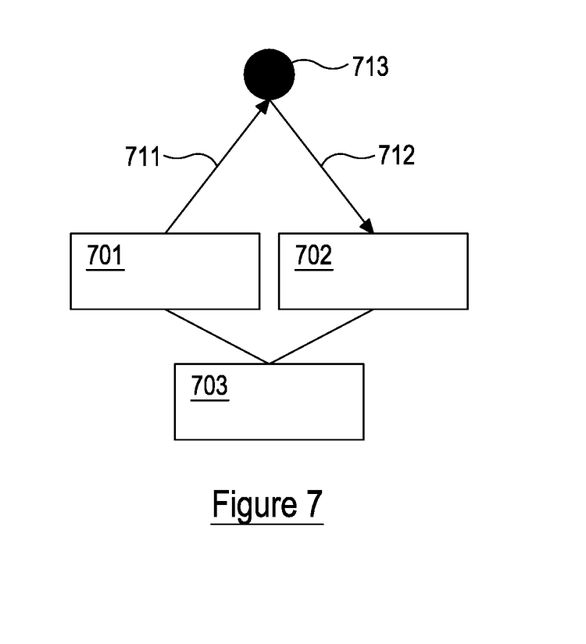
FIG. 7 is a schematic illustration of an exemplary particle detector.

FIG. 7 shows an exemplary particle detector. The particle detector comprises one or more light sources 701, an optical sensor 702, and a controller 703. The one or more light sources collectively operate to simultaneously produce at least two wavelength ranges of emitted light 711. The optical sensor 702 is configured to sense light of the at least two wavelength ranges and to distinguish each range. The light sensed by the optical sensor 702 is scattered light 712 from particles 713 in the region monitored by the detector. The controller 703 is configured to detect such particles 713 based on the light 712 sensed by the optical sensor 702.

Figure 8:
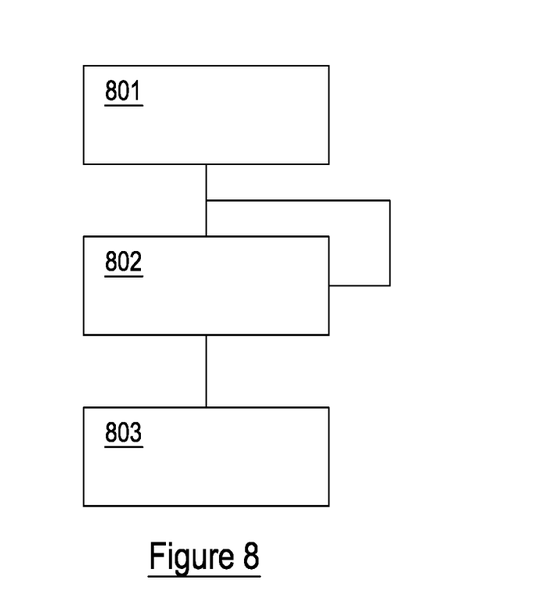
FIG. 8 is a flowchart of an exemplary method.

FIG. 8 is a flowchart of an exemplary method of detecting fires. In step 801, a particle detector capable of detecting smoke particles and determining the size of detected particles is provided. In step 802, measurements from the particle detector are compared to one or more previously determined profiles, each profile comprising information about the expected evolution over time of particle size and density for a fire. In step 803, the detection of a fire is signalled if the time evolution of the measurements of the detector corresponds to one of the profiles.

Further Notes

Embodiments of the present disclosure can be employed in many different applications including smoke detection, air filtration, quality assurance of fluid products (e.g. compresses gasses or water) and other industries. For smoke detection, the examples may be employed both for residential and commercial properties, or within devices including but not limited to electric vehicles and their chargers, dryers, ovens, other kitchen appliances, electronic cigarettes, or any other electronic device.

LIST OF REFERENCE NUMERALS

101 Light source
102 optical sensor
103 outer housing
104 dark housing
105 scattering chamber
106 light
107 smoke
108 scattered light
301 smoke introduced to detector
302 water introduced to detector
401 smoke introduced to detector
402 water introduced to detector
501 light source
502 sensor
503 particle
504 optical device
601 smouldering fire
602 open fire
701 light source (one or more)
702 optical sensor
703 controller
711 emitted light
712 scattered light
713 particle
801 first step of exemplary method
802 second step of exemplary method
803 third step of exemplary method The skilled person will understand that in the preceding description and appended claims, positional terms such as 'above', 'along', 'side', etc. are made with reference to conceptual illustrations, such as those shown in the appended drawings. These terms are used for ease of reference but are not intended to be of limiting nature. These terms are therefore to be understood as referring to an object when in an orientation as shown in the accompanying drawings.

Where the term "light" is used herein, this is not limited to visible light, but also includes other parts of the electromagnetic spectrum, e.g. visible, infra-red and/or ultraviolet light. Similarly, where a sensor is describes as "optical", this does not limit it to detecting visible light, but includes any light which falls within the above definition.

Although the disclosure has been described in terms of examples as set forth above, it should be understood that these examples are illustrative only and that the claims are not limited to those examples. Those skilled in the art will be able to make modifications and alternatives in view of the disclosure which are contemplated as falling within the scope of the appended claims. Each feature disclosed or illustrated in the present specification may be incorporated in any embodiments, whether alone or in any appropriate combination with any other feature disclosed or illustrated herein

The invention claimed is:

1. A particle detector comprising:
   one or more light sources collectively operable to simultaneously produce at least two wavelength ranges of emitted light;
   an optical sensor configured to sense light of the at least two wavelength ranges emitted by the one or more light sources and to distinguish each range; and
   a controller configured to detect particles based on the light sensed by the optical sensor
   wherein the particle detector has one or more profiles stored thereon, the one or more profiles comprising:
      a profile indicating smouldering electronics, wherein as smouldering increases, a number of particles increases and a size of the particles increases in a range from 0.001 to 0.1 microns; and
      a profile indicating open fire, wherein the number of particles increase more rapidly than in the profile indicating smouldering electronics and the size of the particles increases to greater than 0.1 microns.

2. A particle detector according to claim 1, wherein the controller is configured to:
   obtain a background measurement, the background measurement being a measurement of light sensed by the optical sensor during a period when the one or more light sources are not producing light;
   adjust future measurements received from the optical sensor on the basis of the background measurement.

3. A particle detector according to claim 1, wherein the controller is configured to:
  obtain a background measurement, the background measurement being a measurement of light sensed by the optical sensor during a period when the one or more light sources are not producing light;
  determine one or more wavelength ranges of the at least two wavelength ranges of emitted light for which the background measurement is acceptable, and to detect particles based on light sensed by the optical sensor in only those one or more wavelength ranges.

4. A particle detector according to claim 2, wherein the one or more light sources are pulsed, and the controller is configured to obtain the background measurement during the off-cycle of each pulse.

5. A particle detector according to claim 1, wherein the one or more light sources emits frequency modulated light, and the controller is configured to apply corresponding demodulation to the measurements of the sensor; and/or, and wherein the one or more light sources and the optical sensor are not within a housing.

6. A particle detector according to claim 1, wherein the light source emits light in pulses, and the controller is configured to determine a distance of detected particles based on a time difference between a start of a pulse of the light source and a start of a pulse in the light sensed by the optical sensor.

7. A particle detector according to claim 1, wherein the controller is configured to discriminate between particle sizes based on differences between the light sensed at each of the wavelength ranges.

8. A particle detector according to claim 1, wherein the particle detector is a smoke detector.

9. A particle detector according to claim 8, wherein the controller is configured to discriminate between smoke and water based on comparing light sensed in first and second wavelength ranges of the two or more wavelength ranges.

10. A particle detector according to claim 9, wherein the controller is configured to determine a ratio of light sensed in a first wavelength range and light sensed in a second wavelength range, and discriminate between smoke and water based on said ratio.

11. A particle detector according to claim 9, wherein a first wavelength range of the at least two wavelength ranges is within the visible light spectrum, and a second wavelength range of the at least two wavelength ranges is within the near infrared spectrum.

12. A particle detector according to claim 8, wherein the controller is configured to compare light sensed by the optical sensor to the one or more profiles, each of the one or more profiles comprising information about the expected evolution over time of light sensed by the sensor during a fire, and to signal the detection of a fire if the time evolution of the light sensed by the optical sensor corresponds to one of the one or more profiles.

13. An electronic device having integrated within it a smoke detector, wherein the smoke detector is configured to cut power to other components of the electronic device on detection of smoke, the smoke detector having one or more profiles stored thereon, the one or more profiles comprising:
  a profile indicating smouldering electronics, wherein as smouldering increases, a number of particles increases and a size of the particles increases in a range from 0.001 to 0.1 microns; and
  a profile indicating open fire, wherein the number of particles increase more rapidly than in the profile indicating smouldering electronics and the size of the particles increases to greater than 0.1 microns.

14. An electronic device according to claim 13, wherein the smoke detector is a particle detector comprising:
  one or more light sources collectively operable to simultaneously produce at least two wavelength ranges of emitted light;
  an optical sensor configured to sense light of the at least two wavelength ranges emitted by the one or more light sources and to distinguish each range; and
  a controller configured to detect particles based on the light sensed by the optical sensor.

15. An electronic device according to claim 13, wherein the electronic device is one of:
  an electric vehicle;
  a dryer;
  an oven;
  an electronic cigarette; and
  a coffee machine.

16. A ventilation system having integrated within it a particle detector according to claim 8, wherein the particle detector is configured to detect smoke in an air flow through the ventilation system.

17. A method of detecting fires, the method comprising:
  providing a particle detector capable of detecting smoke particles and determining sizes of detected particles;
  comparing measurements from the particle detector to one or more previously determined profiles, each profile comprising information about the expected evolution over time of particle size and density for a fire;
  signalling the detection of a fire if the time evolution of the measurements of the detector corresponds to one of the profiles, the one or more previously determined profiles comprising:
  a profile indicating smouldering electronics, wherein as smouldering increases, a number of particles increases and a size of the particles increases in a range from 0.001 to 0.1 microns; and
  a profile indicating open fire, wherein the number of particles increase more rapidly than in the profile indicating smouldering electronics and the size of the particles increases to greater than 0.1 microns.

18. A method according to claim 17, wherein each of the one or more previously determined profiles corresponds to a particular fire stage and to the combustion of one or more materials.

19. A method according to claim 17, wherein signaling the detection of a fire comprises indicating a fire stage corresponding to the identified profile.

* * * * *